United States Patent [19]

de Cleur et al.

[11] 4,112,012

[45] Sep. 5, 1978

[54] PULVERULENT COATING AGENTS

[75] Inventors: Eckhard de Cleur, Duisburg; Rolf Dhein, Krefeld-Bockum; Hans Rudolph, Krefeld-Bockum; Hans Joachim Kreuder, Krefeld-Bockum, all of Fed. Rep. of Germany

[73] Assignee: Bayer Aktiengesellschaft, Fed. Rep. of Germany

[21] Appl. No.: 801,074

[22] Filed: May 27, 1977

Related U.S. Application Data

[63] Continuation of Ser. No. 544,123, Jan. 27, 1975, abandoned, which is a continuation of Ser. No. 373,470, Jun. 25, 1973, abandoned.

[30] Foreign Application Priority Data

Jun. 30, 1972 [DE] Fed. Rep. of Germany ....... 2232084

[51] Int. Cl.$^2$ ............................................. C08L 63/00
[52] U.S. Cl. ................... 260/835; 260/40 R; 427/195
[58] Field of Search ................ 260/835; 204/181; 427/195

[56] References Cited

U.S. PATENT DOCUMENTS

| | | | |
|---|---|---|---|
| 2,890,194 | /1959 | Phillips et al. | 260/835 |
| 3,027,279 | /1962 | Kurka et al. | 260/835 |
| 3,340,212 | /1967 | Tomita | 260/835 |
| 3,641,194 | 2/1972 | Schmid et al. | 260/835 |
| 3,642,938 | 2/1972 | Schmid | 260/835 |

*Primary Examiner*—Carman J. Seccuro
*Attorney, Agent, or Firm*—Connolly and Hutz

[57] ABSTRACT

Object of the invention are pulverulent coating compositions which are obtained if the coating compositions contain as crosslinking agents polyglycidyl esters of polycarboxylic acids and as binders polyesters from polyalcohols and predominantly aromatic polycarboxylic acids which contain free carboxyl groups.

11 Claims, No Drawings

PULVERULENT COATING AGENTS

CROSS-REFERENCE TO RELATED APPLICATION

This application is a continuation of application Ser. No. 544,123 filed Jan. 27, 1975 and now abandoned which, in turn, is a cntinuation of application Ser. No. 373,470, filed June 25, 1973 and now abandoned.

The invention relates to pulverulent coating agents of polyesters containing free carboxyl groups and glycidyl esters of polybasic carboxylic acids.

DT-OS No. 1,905,825 discloses linear polyesters, which are manufactured from dicarboxylic acids and excess amounts of diols, as powder lacquer binders. These products can be crosslinked, via the free hydroxyl groups, by means of mixtures of triglycidylisocyanurate and polycarboxylic acid anhydride. However, the polyesters mentioned are so chosen that their relative viscosities lie between 1.51 and 1.55, so that they must be ground whilst cooled with carbon dioxide. The products melt above 180° C. and are stoved above 270° C.

It is further known, from DT-OS No. 2,015,563, to combine slightly branched polyesters, containing free carboxyl groups and based on succinic acid and butane-1,4-diol, with diepoxide compounds and to obtain elastomeric, rubbery-elastic mouldings by heat treatment of these compositions. An interesting possible application is started to be their use as fluidised bed powders.

Since the polyesters described must be crystalline, the purity of the products has to meet high standards. Furthermore, these systems consist to the extent of over 90 mol percent of a structural element formed from succinic acid and butane-1,4-diol, as a result of which less hard but more rubbery lacquerings are produced.

Surprisingly, it has now been found that the disadvantages described can be avoided and in addition thermosetting pulverulent coating agents with improved properties can be obtained if the coating agents contain, as crosslinking agents, polyglycidyl esters of polycarboxylic acids, and as binders, polyesters from polyalcohols and predominantly aromatic polycarboxylic acids, which contain free carboxyl groups. According to a preferred embodiment, the subject of the invention are pulverulent coating agents which can be cured between about 130° C. and about 220° C., preferably between about 150° C. and 220° C. and optionally contain catalysts, further customary additives and optionally customary curing agents for polyepoxide compounds, the coating agents consisting of mixtures of (a) polyesters, containing free carboxyl groups, with softening points between about 40° to 140° C. and with acid numbers between about 20 and about 150, preferably between about 50 and about 100, from polyalcohols and aromatic dicarboxylic acids which can optionally be replaced, to the extent of up to 30 mol percent, by cycloaliphatic and/or aliphatic dicarboxylic acids, and (b) polyglycidyl esters of aromatic and/or cycloaliphatic and/or aliphatic polycarboxylic acids with average molecular weights of between about 200 and about 1,000.

The components (a) and (b) should always be mixed in such amounts that 0.7 to 1.4 equivalents, preferably 0.8 to 1.0 equivalent, of epoxide groups are employed per equivalent of carboxyl group.

The pulverulent coating agents according to the invention are distinguished, relative to those previously mentioned, by the fact that the mixtures can easily be homogenised in the melt at temperatures of about 80° to about 120° C. in suitable mixing apparatuses and can subsequently be ground, without cooling, to the desired particle size, and that they can already be cured at temperatures between about 130° C. and about 220° C. and can be stoved to give hard lacquerings of good levelling properties.

Low molecular polyepoxide compounds based on polyglycidyl esters of polycarboxylic acids can be manufactured from polycarboxylic acids, preferably from those with 2 to 4 carboxyl groups, and epichlorohydrin, or from polycarboxylic acid chlorides and glycidol, or by epoxidation of corresponding polyallyl esters of polycarboxylic acids and allyl alcohol. Examples are to be found in HoubenWeyl, Methoden der organischen Chemie (Methods of Organic Chemistry), (1963), volume 14/2, page 547; J. Chem. Eng. Data, 11, (3), (1966), page 477; J. Org. Chem., 26, (1961), page 2681, and in the literature cited there.

In detail, the following may be mentioned: bisglycidyl esters of aromatic, aliphatic, cycloaliphatic dicarboxylic acids, such as phthalic acid, isophthalic acid, terephtalic acid, tetrahydrophthalic acid, hexahydrophthalic acid, hexahydroterephthalic acid and adipic acid; the tris-glycidyl ester of trimellitic acid and the tetraglycidyl ester of pyromellitic acid. The corresponding $\beta$-methylglycidyl esters can also be used. It is not necessary for the glycidyl esters to be present in a very pure form.

The polyesters containing free carboxyl groups which are to be used, according to the invention, in combination with the polyglycidyl esters can be manufactured according to processes which are in themselves known, preferably from aromatic polycarboxylic acids, such as phthalic acid, isophthalic acid, terephthalic acid, benzene-1,2,4-tricarboxylic acid, pyromellitic acid, trimellitic acid, 3,6-dichlorophthalic acid, tetrachlorophthalic acid or, where obtainable, their anhydrides, and diols, such as ethylene glycol, 1,2-propanediol, 1,3-propanediol, 1,2-butanediol, 1,4-butanediol, 2,2-dimethylpropanediol, 2,5-hexanediol, 1,6-hexanediol, 4,4'-dihydroxydicyclohexylpropane-2,2, cyclohexanediol, dimethylolcyclohexane, diethylene glycol and 2,2-bis-[4-($\beta$-hydroxyethoxy)-phenyl]-propane and polyols, such as glycerine, hexanetriol, pentaerythritol, sorbitol, trimethylolethane, trimethylolpropane and tris-($\beta$-hydroxyethyl)-isocyanurate.

As polycarboxylic acids it is additionally possible to employ cycloaliphatic and/or acyclic polycarboxylic acids, such as, for example, tetrahydrophthalic, hexahydrophthalic and endomethylenetetrahydrophthalic acid, adipic acid, succinic acid and maleic acid in amounts of up to 30 mol percent of all the polycarboxylic acids employed. Monocarboxylic acids, such as benzoic acid, tert.-butylbenzoic acid and hexahydrobenzoic acid, and saturated aliphatic monocarboxylic acids, can also be used conjointly, in minor amounts.

The polyesters are manufactured in a manner which is in itself known by esterification, optionally in the presence of customary catalysts, and by suitable choice of the COOH/OH relation end products of which the acid number is between about 20 and about 150, preferably between about 50 and about 100, are obtained. These preferred polyesters no longer have any free hydroxyl groups. In practical use, however, compositions differing therefrom, with hydroxyl numbers of between 0 and about 30, can be employed.

The polyesters can be obtained by manufacturing polyesters with hydroxyl numbers of between about 50 and 150 from the said polyalcohols and polycarboxylic acids which predominantly consist of aromatic polycarboxylic acids, and reacting these polyesters with aromatic and/or cycloaliphatic dicarboxylic acid anhydrides, using such amounts that esters with acid numbers which lie between about 20 and 150, preferably between about 50 and 100, are obtained.

The softening points of the mixtures of polyesters, containing free carboxyl groups, and polyglycidyl esters are such that the mixtures can be processed at temperatures between about 80° and about 120° C. with the additives required for the manufacture of the coating agents according to the invention. On the other hand, the softening points of the mixtures are such that the coating agents according to the invention can be ground to give non-caking, free-flowing powders of particle size of about 20 to about 120μ. In practice this means that the polyesters, containing free carboxyl groups, which are employed, have softening points between about 40° C. and about 140° C., as determined by differential thermoanalysis.

Particularly good lacquerings are obtained if bisglycidyl esters of hexanydrophthalic acid and/or phthalic acid and/or isophthalic acid and/or terephthalic acid are employed as crosslinking agents and the abovementioned polyhalf-esters containing free carboxyl groups are employed as binders.

The coating agents according to the invention can be manufactured in suitable mixing apparatuses, for example in stirred kettles or mixing screws (extruders). Customary additives, such as pigments, flow control agents, fillers and catalysts, such as tertiary amines and their salts, such as benzyldimethylamine, metal salts of organic acids, such as tin octoate or bismuth salicylate, or imidazoles, can also be added.

The products according to the invention can be converted into powders which are applied to substrates in the customary manner, especially according to the electrostatic powder spraying process (EPS process).

The lacquer films cure rapidly, to give hard and smooth coatings, by heating to temperatures above 130° C., preferably between about 150° C. and 220° C.

The parts mentioned below denote parts by weight.

EXAMPLE 1,800 parts of a polyester from 68.43 parts of bisoxethyl-bisphenol A, 4.17 parts of glycerine and 38.83 parts of terephthalic acid [acid number: 10, OH number: 48; softening point: about 70° C. (DTA)[x)]; viscosity: 155 seconds (50% strength in xylene/n-butanol, 9:1, according to DIN 53,211)] which was manufactured according to known processes, are fused at 150° to 160° C. and reacted, in portions, with 194 parts of tetrahydrophthalic anhydride. After reaching an acid number of about 53, the mixture is poured into containers and cooled.

[x)]DTA = see R. C. Mackenzie, Differential Thermal Analysis, London, (1970), Vol. 1.

Characteristic Data

Acid number: 52–53
Viscosity: 328 seconds (50% strength in dimethylformamide according to DIN 53,211)
Softening point (DTA): 69° to 71° C.

Manufacture of a Powder Lacquer

100 Parts of the abovementioned poly-half-ester and 15 parts of the bis-glycidyl-ester of hexadhydrophthalic acid are homogenised in an extruder at 100° to 120° C. After cooling, the ribbon is crushed. 100 Parts of this material are intimately mixed with 67 parts of titanium dioxide pigment, 1 part of a flow control agent based on cellulose (a product of Messrs Borchers) and 0.5 part of dimethylbenzylamine on an edge runner and subsequently extruded at 100° to 120° C. The cooled ribbon is ground in an attrition mill to a particle size of less than 100μ and is applied to the substrate by means of an electrostatic powder spraying installation at 60 kV. After stoving (20 minutes at 220° C.), hard, glossy, smoothly levelling lacquerings are obtained. Even at stoving temperatures of 220° C., the lacquerings are distinguished by a very good white shade.

What we claim is:

1. A curable pulverulent coating composition comprising (a) a polyester containing free carboxyl groups having a softening point of from 40° to 140° C. and an acid number of from 20 to 150 and being derived from at least one polyalcohol and one polycarboxylic acid which is predominantly aromatic and, as the sole crosslinking agent, (b) at least one polyglycidyl ester having an average molecular weight of from 200 to 1000 which is derived from an aromatic polycarboxylic acid, a cycloaliphatic polycarboxylic acid, an alphatic polycarboxylic acid or a mixture of at least two such acids, said (a) and (b) being present in an amount such that 0.7–1.4 equivalents of epoxide groups are present per equivalent of carboxyl groups.

2. The composition of claim 1 wherein (a) has an acid number of from 50 to 100.

3. The composition of claim 1 wherein (a) has a hydroxyl number of from 0 to 30.

4. The composition of claim 1 wherein the polycarboxylic acid of (a) consists of 70 to 100 mole % of aromatic dicarboxylic acid and 30 to 0 mol % of cycloaliphatic dicarboxylic acid, aliphatic dicarboxylic acid or a mixture of at least two such acids.

5. The composition of claim 1 wherein (a) is derived from an aromatic dicarboxylic acid anhydride, a cycloaliphatic carboxylic anhydride or a mixture of at least two such anhydrides and a hydroxyl group containing polyester derived from a polyalcohol and a carboxylic acid.

6. The composition of claim 5 wherein (a) has a hydroxyl number of from 50 to 150.

7. The composition of claim 5 wherein said anhydride is tetrahydrophthalic acid.

8. The composition of claim 1 wherein (b) is the bisglycidyl ester of hexahydrophthalic acid, phthalic acid, isophthalic acid, terephthalic acid or a mixture of at least two such acids.

9. The composition of claim 1 wherein (a) and (b) are present in an amount such that 0.8–1.0 equivalent of epoxide groups are present per equivalent of carboxyl groups.

10. The composition of claim 1 wherein said carable pulverulent coating composition has a particle size of 20 to 120μ.

11. A method of lacquering an article which comprises applying to the article a coating of a pulverulent composition of claim 1 and curing the coating at a temperature of above 130° C.

* * * * *